US012246651B2

United States Patent
Sviberg et al.

(10) Patent No.: US 12,246,651 B2
(45) Date of Patent: Mar. 11, 2025

(54) SENSOR MODULE FOR BEING MOUNTED ON A PANEL COMPONENT OF A MOTOR VEHICLE AND PANEL COMPONENT COMPRISING SUCH A SENSOR MODULE

(71) Applicant: Webasto SE, Stockdorf (DE)

(72) Inventors: Magnus Sviberg, Stockdorf (DE); Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 90 days.

(21) Appl. No.: 17/980,772

(22) Filed: Nov. 4, 2022

(65) Prior Publication Data

US 2023/0158966 A1 May 25, 2023

(30) Foreign Application Priority Data

Nov. 19, 2021 (DE) .................... 10 2021 130 337.0

(51) Int. Cl.
*B60R 11/00* (2006.01)
*B62D 25/06* (2006.01)
*G01S 7/02* (2006.01)
*G01S 13/931* (2020.01)
(Continued)

(52) U.S. Cl.
CPC .............. *B60R 11/00* (2013.01); *B62D 25/06* (2013.01); *G01S 7/028* (2021.05); *G01S 13/931* (2013.01); *H04N 23/51* (2023.01); *H04N 23/54* (2023.01); *B60R 2011/0028* (2013.01); *B60R 2011/008* (2013.01); *G01S 2013/9323* (2020.01); *G01S 2013/9324* (2020.01); *G01S 2013/93273* (2020.01)

(58) Field of Classification Search
None
See application file for complete search history.

(56) References Cited

U.S. PATENT DOCUMENTS 5,027,200 A * 6/1991 Petrossian ................ B60R 1/26
396/419
11,851,106 B2 * 12/2023 Huelsen ................ B62D 25/06
(Continued)

FOREIGN PATENT DOCUMENTS

DE 102007005322 A1 7/2008
DE 102014015914 A1 10/2015
(Continued)

*Primary Examiner* — John W Miller
*Assistant Examiner* — Sean N. Haiem
(74) *Attorney, Agent, or Firm* — Fitch, Even, Tabin & Flannery, LLP

(57) ABSTRACT

Sensor module for mounting on a motor vehicle panel component having a sensor housing, at least one environment sensor, at least part of which is disposed in the sensor housing, and which is configured to send and/or receive electromagnetic signals to thus detect a vehicle environment, and a kinematic system having a drive configured to move the sensor housing from a retracted position into at least one deployed position. The kinematic system is configured to move the sensor housing into a first deployed position, which activates the at least one environment sensor to detect the vehicle environment in a portion of its field of view, and to move the sensor housing into a second deployed position, which activates the at least one environment sensor to detect the vehicle environment in its entire field of view.

12 Claims, 7 Drawing Sheets

(51) Int. Cl.
*H04N 23/51* (2023.01)
*H04N 23/54* (2023.01)

(56) References Cited

U.S. PATENT DOCUMENTS

| | | | | |
|---|---|---|---|---|
| 2005/0073433 A1* | 4/2005 | Gunderson | ........... | G01S 13/931 |
| | | | | 340/903 |
| 2012/0297969 A1* | 11/2012 | King | ............. | F41H 13/005 |
| | | | | 250/203.2 |
| 2013/0182112 A1* | 7/2013 | Liepold | ............ | H04N 23/50 |
| | | | | 348/148 |
| 2017/0246990 A1* | 8/2017 | Rosenblum | ........... | G01S 15/931 |
| 2018/0361998 A1* | 12/2018 | Renaud | ............. | H04N 23/811 |
| 2022/0169314 A1* | 6/2022 | Huelsen | ............ | B62D 29/043 |
| 2023/0146876 A1* | 5/2023 | Sviberg | ............ | G01S 13/931 |
| | | | | 224/567 |
| 2023/0211740 A1* | 7/2023 | LaCross | ............. | B60R 1/12 |
| | | | | 348/148 |
| 2024/0077576 A1* | 3/2024 | Long | ............. | B60R 11/04 |

FOREIGN PATENT DOCUMENTS

| | | |
|---|---|---|
| DE | 102016013295 A1 | 5/2017 |
| WO | 2011007008 A2 | 1/2011 |

\* cited by examiner

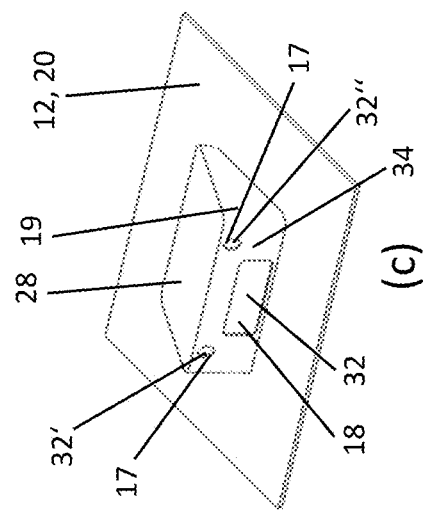
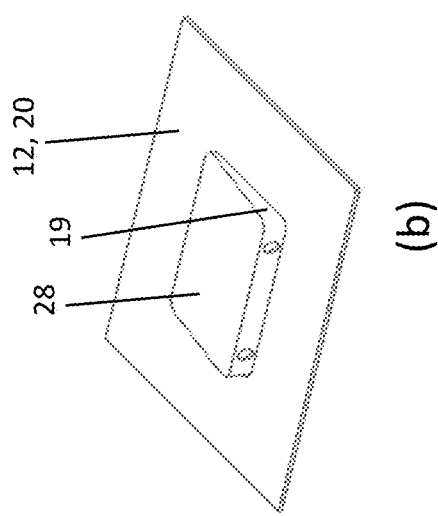
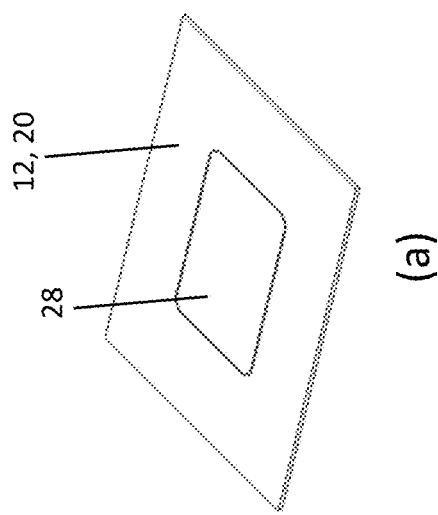
Fig. 3

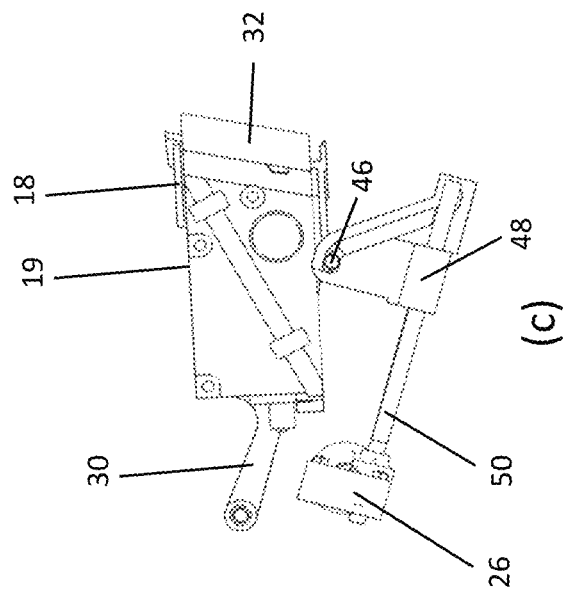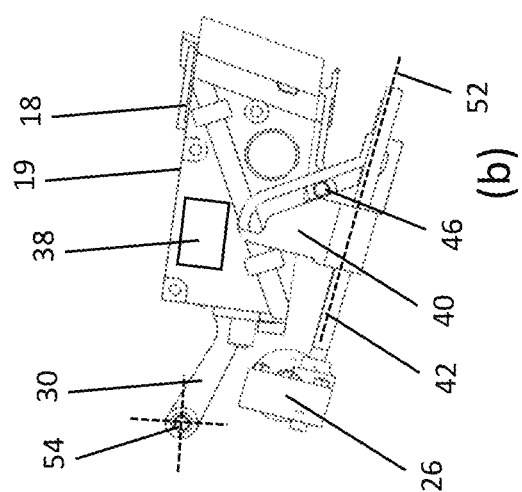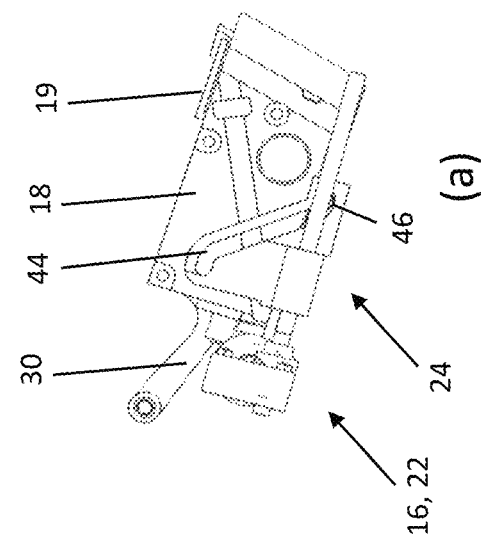
Fig. 8

SENSOR MODULE FOR BEING MOUNTED ON A PANEL COMPONENT OF A MOTOR VEHICLE AND PANEL COMPONENT COMPRISING SUCH A SENSOR MODULE

CROSS-REFERENCE TO RELATED APPLICATION

This application claims priority from German patent application no. 10 2021 130 337.0 filed on Nov. 19, 2021, which is hereby incorporated herein by reference in its entirety for all purposes.

FIELD

The invention relates to a sensor module for being mounted on a panel component of a motor vehicle according to the preamble of claim 1.

BACKGROUND

Generic sensor modules are known from the state of the art and have been in use in vehicle manufacturing. For example, sensor modules of this kind are used to monitor a parking process, ultrasonic sensors being typically used as environment sensors.

Sensor modules of this kind often comprise a sensor housing and an environment sensor, at least part of which is disposed in the sensor housing and which is configured to send and/or receive electromagnetic signals to thus detect a vehicle environment, for example, during a parking process. The known sensor modules can be rigidly disposed on top of a panel component (a body part of the motor vehicle). However, such a placement can be disadvantageous for a visual appearance (referred to as styling) of the motor vehicle later since the prominence caused by the sensor module on the outer surface disrupts an otherwise prominence-free visual contour of the body, which the customer often perceives as negative. Moreover, a stationary position of a sensor module has a negative impact on the aerodynamics of the motor vehicle since undesired air turbulence may occur at the prominence during travel. This turbulence can cause acoustic noise, which a vehicle passenger typically perceives as negative. Furthermore, the disruptive aerodynamic contours can lead to an increase in the fuel consumption of the motor vehicle. Moreover, there is the risk that a see-through area through which the environment sensor detects the vehicle environment accumulates dirt or becomes opaque to the environment sensor or is even damaged (e.g., by hail) because of constant environmental and weather conditions.

As a partial solution of these issues, it is known for a sensor module to be equipped with a kinematic system having a drive configured to move the environment sensor from a retracted position into a deployed position. Thus, the environment sensor can be retracted when it is not needed so that it no longer constitutes a disruptive acoustic and/or aerodynamic factor. Sensor modules movable in this manner can often be moved individually and can only be adjusted between a completely closed position and a completely open position. However, when the mobile sensor modules or environment sensors are deployed, allowing the environment sensor in question to detect the vehicle environment, they also constitute a disruptive aerodynamic and visual factor.

Furthermore, the development in vehicle manufacturing is increasingly focusing on autonomously and semi-autonomously driving motor vehicles. In order to enable the vehicle controller to control the motor vehicle autonomously or semi-autonomously, a plurality of von environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the detected environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by suitable signal evaluation and to be used for controlling the vehicle. These environment sensors for monitoring and detecting the vehicle environment are typically attached to the vehicle roof since the vehicle roof is typically the highest point of a vehicle, from which the vehicle environment is easily visible. However, sensor modules of this kind can also be disposed on other panel components of the motor vehicle to thus enable a comprehensive detection of the vehicle environment.

Exemplary roof modules are prefabricated as separate functional modules, which can be supplied to the assembly line when assembling the motor vehicle. The roof module at least partially forms a roof skin of the vehicle roof at its outer surface, the roof skin preventing moisture and air flows from entering the vehicle interior. The roof skin is composed of one or more panel components, which can be made of a stable material, such as painted metal or painted or died-through plastic. The roof module can be a part of a fixed vehicle roof or a part of an openable roof sub-assembly.

While it is generally known for sensor modules or environment sensors to be disposed in a panel component of a motor vehicle in a retractable and deployable manner, existing solutions present several disadvantages, which remain to be overcome. For instance, it is disadvantageous that the known sensor modules can be moved between a retracted position and a fully deployed position only. Moreover, autonomous vehicles, in particular, have a plurality of different environment sensors, each of which has to be integrated individually in a panel component in question, such as a roof module, in a retractable and deployable manner. Thus, each environment sensor needs its own kinematic system, which has to be installed and maintained. Moreover, the retraction and the deployment of each environment sensor has to be controlled individually. This makes the technical system highly complex, which is reflected in high production and maintenance costs.

SUMMARY

Hence, the object of the invention is to propose a sensor module and/or a signal-transmitter and/or signal-receiver module that overcomes the disadvantages of the state of the art described above and is in particular less technically complex. In particular, a number of required components is to be reduced so that the related production and maintenance costs can be reduced, as well. Furthermore, the object of the invention is to indicate a panel component comprising at least one sensor module and/or signal-transmitter and/or signal-receiver module of this kind.

This object is attained by a roof module according to the teaching of claim 1.

Advantageous embodiments of the invention are the subject matter of the dependent claims.

In its intended use, the sensor module and/or the signal-transmitter and/or signal-receiver module according to the invention is configured to be disposed on a panel component (which forms part of a vehicle body, for example) of a motor vehicle, in particular in an opening of a panel component.

The sensor module according to a first aspect of the invention comprises a sensor housing and at least one environment sensor, at least part of which is disposed in the sensor housing and which is configured to send and/or receive electromagnetic signals to thus detect a vehicle environment. Furthermore, the sensor module according to the first aspect of the invention comprises a kinematic system having a drive (e.g., provided by an electric motor and/or an electric stepper motor) configured to move the sensor housing (and the at least one environment sensor with it) from a retracted position into at least one deployed position. The sensor module according to the invention is characterized in that the kinematic system is configured to move the sensor housing (and the at least one environment sensor with it) into a first deployed position, which activates the at least one environment sensor to detect the vehicle environment in only a portion of its field of view, and to move the sensor housing into a second deployed position, which activates the at least one environment sensor to detect the vehicle environment in its entire field of view (i.e., within its entire field of view).

The sensor module according to a second aspect of the invention comprises a sensor housing and a first and a second environment sensor. The first and second environment sensors are each at least partially disposed in the sensor housing and are each configured to send and/or receive electromagnetic signals to thus detect a vehicle environment. Furthermore, the sensor module according to the invention comprises a kinematic system having a drive configured to move the sensor housing from a retracted position into at least one deployed position. The sensor module according to the invention is characterized in that the kinematic system is configured to move sensor housing (and the at least one environment sensor with it) into a first deployed position, which activates the first environment sensor to detect the vehicle environment and in which the second environment sensor is preferably deactivated, and to move the sensor housing into a second deployed position, which activates the second environment sensor (too) to detect the vehicle environment. In the second deployed position, which can preferably correspond to a fully deployed position of the sensor housing, both the first and the second environment sensor are preferably activated.

In other words, the sensor module according to the invention can be characterized in that the kinematic system is configured to move the sensor housing (and the at least one environment sensor with it) into a first deployed position, which activates the at least one environment sensor to detect at least part of its field of view or its entire field of view, and/or to move the sensor housing into a second deployed position, which activates the second environment sensor to detect at least part of its field of view or its entire field of view. So the sensor module can comprise one or more environment sensors, which are not activated or detect a part of their field of view or detect their entire field of view as a function of the respective environment sensor position. Moreover, the kinematic system can of course be configured to move the sensor housing (and the at least environment sensor with it) into any number of intermediate positions between the first and second deployed position. Depending on the intermediate position, the at least one environment sensor can be activated to detect the vehicle environment partially or in its entire field of view. The activation of the at least one environment sensor to detect more and more of the vehicle environment can increase continuously or in steps as the sensor housing is being moved.

The object of the invention is further attained by a signal-transmitter and/or signal-receiver module according to a third aspect, which comprises a housing and at least one signal transmitter and/or signal receiver, at least part of which is disposed in the housing and which is configured to send and/or receive signals. Furthermore, the signal-transmitter and/or the signal-receiver module according to the third aspect of the invention comprises a kinematic system having a drive (provided by an electric motor and/or an electric stepper motor) configured to move the housing (and the at least one signal-transmitter module and/or signal receiver with it) from a retracted position into at least one deployed position. The signal-transmitter and/or signal-receiver module according to the invention is characterized in that the kinematic system is configured to move the housing into a first deployed position, which activates the at least one signal-transmitter and/or signal-receiver module to send and/or receive signals with only part of its sending and/or receiving capacity, and to move the housing into a second deployed position, which activates the at least one signal transmitter and/or signal receiver to send and/or receive signals with its full sending and/or receiving capacity.

The object according to the invention is further attained by a signal-transmitter and/or signal-receiver module according to a fourth aspect, which comprises a housing and a first and a second signal transmitter and/or signal receiver. The first and the second signal transmitter and/or signal receiver are each at least partially disposed in the housing and are each configured to send and/or receive signals. Furthermore, the signal-transmitter and/or the signal-receiver module according to the invention comprises a kinematic system having a drive configured to move the housing from a retracted position into at least one deployed position. The signal-transmitter and/or the signal-receiver module according to the invention is characterized in that the kinematic system is configured to move the housing into a first deployed position, which activates the first signal transmitter and/or signal receiver at least partially and in which the second signal transmitter and/or signal receiver is preferably deactivated, and to move the housing into a second deployed position, which activates the second signal transmitter and/or signal receiver at least partially (too). In the second deployed position, which can preferably correspond to a fully deployed position of the housing, both the first and the second signal transmitter and/or signal receiver are preferably activated.

The at least one signal transmitter and/or signal receiver can preferably be a light source, an antenna, a communication module, a loudspeaker. Particularly preferably, the at least one signal transmitter and/or signal receiver is a light source for an automated and/or autonomous and/or semi-autonomous driving mode.

Naturally, the dependent claims, the embodiments and/or the illustrative examples mentioned in relation to the sensor module equivalently relate to the signal-transmitter and/or signal-receiver module without being explicitly mentioned in its context. In particular, the explanations of dependent claims 3 and 4 to 14 naturally each also relate to the third and fourth aspects of the invention in terminological variation (environment sensor to be replaced with signal transmitter and/or signal receiver; sensor module to be replaced with signal-transmitter and/or signal-receiver module).

The expression "at least one" means that one or more than one of the component mentioned in the given context can be comprised according to the invention. For instance, the sensor module can comprise one or more environment sensors, i.e., at least one environment sensor. The sensor housing can preferably be configured in such a manner that it fully accommodates the at least one environment sensor (i.e., the first and the second environment sensor) and preferably fully encloses the at least one environment sensor. The sensor housing preferably forms a dry area in its interior, in which the at least one environment sensor is protected from moisture. In the "retracted position", the sensor housing is preferably disposed in such a manner in an opening of the panel component in question that it does not protrude over the opening. In the fully retracted position, the at least one environment sensor is inactive, i.e., it does not detect the vehicle environment.

In the "at least one deployed position", the at least one environment sensor preferably protrudes over a panel component in question in order to detect the vehicle environment. The first deployed position is preferably situated between the retracted position and the fully deployed position. In the first deployed position, the sensor housing is preferably partially but not yet fully deployed, which means that only part of the sensor housing protrudes over the panel component compared to the fully deployed position (which preferably corresponds to the second deployed position). Once the at least one environment sensor is located in a deployed position (e.g., the first deployed position), at least part of a see-through area, through which the at least one environment sensor looks in order to detect the vehicle environment, preferably protrudes over the panel component.

According to the invention, it is thus possible for the environment sensor to detect only part of the vehicle environment when in the first deployed position since only part of its see-through area protrudes over the panel component. Thus, the at least one environment sensor is only partially activated to detect the vehicle environment. The other part of the sensor field of view is still disposed below the surface of the panel component in the interior of a vehicle body. In the first deployed position, the environment sensor detects only part of the vehicle environment, whereas the other part of its field of view is covered and not available for detection. This configuration is advantageous, for example, if only a specific portion of the vehicle environment has to be detected, e.g., during a parking process, in order to detect the necessary information. In such a case, the invention allows the environment sensor to be deployed only partially so that it does not protrude as far over the panel component in question. This can also be advantageous, for example, when the vehicle is driving on a highway, where only a certain portion of the vehicle environment has to be detected since there are no other disturbance variables (pedestrians or the like). In this case, the environment sensor may be moved into the first deployed position only and protrudes relatively little over the panel component. This is particularly advantageous since the sensor housing or the environment sensor presents only a small disruptive aerodynamic factor compared to a fully deployed position. The improved aerodynamics reduce the occurrence of noise and save fuel.

According to the invention, it is advantageous that a specific environment sensor can be activated as a function of the deployed position (e.g., the first and the second deployed position), whereas a different environment sensor stays inactive in this deployed position. For instance, the first environment sensor can be activated when the sensor housing has been moved into the first deployed position. The second environment sensor, on the other hand, stays inactive in the first deployed position, i.e., it does not detect the vehicle environment. If the sensor housing is now moved into the second deployed position, i.e., extended further out of the panel component, the second environment sensor is activated to detect the vehicle environment. This is of great advantage since a selective activation of sensors as a function of the deployed position is possible. Thus, there is no need for separate environment sensors as in the state of the art; instead, multiple environment sensors can be incorporated in a single sensor module and be disposed in a single sensor housing. If one of the environment sensors is needed, the sensor housing can be moved into a predetermined deployed position in which the environment sensor in question is activated. This allows the number of components to be reduced compared to the state of the art. Also, the complexity of installation and maintenance decreases since only few sensor modules have to be incorporated in a panel component. Thus, the environment sensors do not each require their own drive; instead, multiple environment sensors are jointly integrated in one sensor module. This allows the solution according to the invention to be more cost-efficient and comparatively lighter (of less weight). Also, the solution according to the invention is very compact and therefore easy to install and maintain. Also, it is possible for the aerodynamics of the sensor housing to be optimized individually for each deployed position with the result that air can flow around the sensor housing protruding from the panel component in an aerodynamically ideal manner at all times.

A field of view of an environment sensor extends conically around its optical axis. A cone opening angle depends on the sensor type and can be enlarged by an optical unit, such as a lens or a lens system, for example (e.g., in the case of a fish eye lens).

In a preferred embodiment of the first aspect, the kinematic system is configured to move the sensor housing into any intermediate position between the retracted position and a fully deployed position as a function of a predefined field of view required in a given situation. For example, it is also possible for the sensor housing to be extended from the panel component only far enough for a predefined area of the vehicle environment to be detectable by the environment sensor in a certain situation. If it is necessary for an entire vehicle environment to be detected if possible on the other hand, the sensor housing can be fully deployed so that the vehicle environment can be detected in the entire field of view of the environment sensor.

In a preferred embodiment of the second aspect, the kinematic system comprises a controller configured to detect and/or adjust a current position of the sensor housing, preferably by means of a position detection sensor, and to activate the first and/or the second environment sensor as a function of the current position. For example, if the controller detects that the sensor housing is in the first deployed position, the controller activates the first environment sensor. The second environment sensor stays active, i.e., it is not activated by the controller. If the controller detects, for example, that the sensor housing is in the second deployed position or is moved into it, the controller activates the second environment sensor. In the second position, the first environment sensor can either stay activated or be alternatively deactivated again by the controller.

Particularly preferably, the first environment sensor is placed on the sensor housing in such a manner that its see-through area, through which it looks in order to detect the vehicle environment, protrudes over the panel component (i.e., an outer surface of the panel component) when in the first deployed position. The second environment sensor, on the other hand, is preferably disposed on the housing in such a manner that its see-through area, through which it looks in order to detect the vehicle environment, does not yet protrude over the panel component (i.e., an outer surface of the panel component) when in the first deployed position. The see-through area of the second environment sensor does not protrude over the panel component (i.e., an outer surface of the panel component) until the sensor housing has been moved into the second deployed position. So preferably both environment sensors protrude over the panel component when in the second deployed position.

It is noted that it is possible in principle for other environment sensors (e.g., a third environment sensor) to be disposed in the sensor housing. A third environment sensor can be placed on the sensor housing in such a manner, for example, that it is activated to detect the vehicle environment when in a third deployed position, which can be situated between the first and the second deployed position.

In the second deployed position, the fields of view of the first and second environment sensors preferably overlap according to the invention so that portions of the vehicle environment are detected redundantly. This can be advantageous, for example, in order to perform plausibility tests on the detected vehicle environment since redundant datasets are gathered in this manner.

In a preferred embodiment, the kinematic system comprises a slide. Furthermore, the drive can preferably comprise a drive pinion. The drive is connected to the slide in a force-transmitting manner (directly or indirectly (with other components interposed)) via a flexible shaft or a spindle nut drive. Alternatively or additionally, the kinematic system can comprise a linear drive and/or a solenoid actuator and/or a gyrodrive and/or a compressed-air drive. A gyrodrive can be advantageous in particular for a quick retraction of the sensor housing, e.g., for pedestrian protection. A flexible shaft or a spindle nut drive or another operative connection (e.g., a lever connection) can be disposed on a preferred drive pinon, for example. The flexible shaft or the spindle nut drive or the operative connection is preferably connected to the drive pinion in a force-transmitting manner on one side. On its other side (with respect to its longitudinal direction), the flexible shaft or the spindle nut drive or the other operative connection is connected to the slide in a force-transmitting manner. The drive can preferably move the slide along its drive axis.

In the case of the spindle nut drive, the drive moves a spindle nut back and forth relative to a spindle. This relative movement between the spindle nut and the spindle can be translated into a movement of the sliding pin. In the case of the spindle nut drive, the sliding pin is preferably connected to the spindle nut in a fixed manner, i.e., for co-rotation, and engages the slot in a sliding manner with its other end.

In a preferred embodiment, the drive is configured to move the slide back and forth (translationally) along the drive axis along an essentially (i.e., tolerance- and function-related deviations considered) guided, preferably linear, curved, circular and/or similarly shaped track by means of the flexible shaft or the spindle nut drive. The translational movement of the slide along the drive axis is preferably translated into a rotation of the sensor housing about the axis of rotation by means of the sliding pin, which is fixed in place on the sensor housing, the rotation moving the sensor housing and the at least one environment sensor (i.e., the first and the second environment sensor) with it from the retracted position into the at least one deployed position. To this end, the sensor housing is preferably attached to the panel component or a substructure (e.g., a roof body frame or another body frame) in such a manner that it can be rotated via a guide lever.

In a preferred embodiment, a slot is provided in the slide, a sliding pin being supported in the slot in a translationally movable manner. The sliding pin is preferably disposed on the sensor housing and/or a spindle nut of a spindle nut drive in a translationally immobile manner. The sliding pin or the guiding pin can preferably slide in the slot. The movement of the sliding pin along or in the slot can preferably initiate the movement of the sensor housing or the environment sensor which allows the environment sensor to be moved from the retracted position into the at least one deployed position (first deployed position and/or second deployed position). The slide is preferably guided on a linear track (e.g., similar to a rail). The slot is preferably a predefined slot in the slide, the shape and length of the slide allowing a desired motion sequence to be realized.

Particularly preferably, the slot comprises a ramp-shaped track section (having a ramp shape). Other shapes of the slots are possible in principle, as well. One advantage of the control slot is that it enables a speed-optimized movement of the environment sensor while requiring little installation space for the movement mechanism. The sliding pin is preferably secured against dropping out of the slot (e.g., by means of a protruding bulge (similar to a rivet) or by means of a split pin).

The drive is preferably an electric drive. By providing the flexible shaft, which translates a (rotating) movement of the motor into a linear movement of the drive via the drive pinion, a high degree of design freedom can be ensured since the drive can be placed almost anywhere in an installation space extending laterally next to the environment sensor. Particularly preferably, the drive is configured to move the slide back and forth along an essentially linear track by means of the flexible shaft. The expression "essentially linear track" means that the slide can preferably be moved along one axis of movement only (e.g., parallel to the vehicle width direction) while its movement is limited (except for the provision of a constructively required play) with respect to the other two axes of movement (i.e., it has only one degree of freedom of movement).

In a preferred embodiment, the slot comprises a ramp-shaped track section. The drive is configured to move the slide in such a manner that the sliding pin slides along the ramp-shaped section, the sliding pin being movable between a first stop of the slot, which fixes the sensor housing in the retracted position, and a second stop of the slot, which fixes the sensor housing in a fully deployed position (which preferably corresponds to the second deployed position). The movement of the sliding pin along the ramp-shaped track section initiates the rotation of the sensor housing about its axis of rotation relative to the panel component. The end sections of the slot serve as stops which fix the sensor housing either in the retracted position or in the fully deployed position.

In an embodiment, it may be preferred for the sensor module to comprise at least one cleaning nozzle, which is disposed, for example, in an area laterally next to the see-through area of the environment sensor in order to clean the latter with a cleaning fluid (e.g., a gas or a liquid, (e.g., soapy water)) as necessary. For example, the at least one cleaning nozzle can be provided in the housing portion in which the see-through area is disposed. The cleaning nozzle can be retractable and deployable or be fixed. If the cleaning nozzle is retractable and deployable, it may be advantageous for the cleaning nozzle to be retractable and deployable by water pressure or a mechanical drive. In principle, it is also possible for the slot to comprise another track section, e.g., a ramp-shaped track section, and that movement of the sliding pin in this second ramp-shaped section allows the at least one cleaning nozzle to be retracted and deployed. Thus, it can be possible for the movement of the cover, the environment sensor and the cleaning nozzle to be provided via a single motion sequence (the movement of the sliding pin in the slot), the individual movements of the cover, the environment sensor and the cleaning nozzle also being possible independently of each other (i.e., by partial execution of the motion sequence).

In a preferred embodiment, the sliding pin is fixed to the environment sensor or the sensor housing in a fixed manner. It is preferred for the at least one environment sensor (i.e., the first and the second environment sensor) to be mounted on the panel component (or a frame structure of the panel component) in a rotatable manner, e.g., by being suspended on the sensor housing, in this configuration. The sensor housing can preferably rotate about a single axis of rotation only and is otherwise fixed relative to the roof module. For example, this configuration allows a relative movement of the slide along the (linear) axis of movement to be translated into a rotation of the sensor housing about the axis of rotation by a sliding of the sliding pin within the slot since the sliding pin is immobile, i.e., fixed, relative to the sensor housing. Hence, the sliding pin slides between the first (lower) stop in the direction of the second stop along the ramp-shaped slot, thereby changing its relative distance from the axis of movement of the slide, which is fixed relative to the panel component, with respect to a vertical direction until the guiding pin strikes the second stop and the fully deployed position has been reached.

The sensor module according to the invention can comprise basically any type of environment sensor. Particularly preferably, a lidar sensor and/or a radar sensor and/or a camera sensor and/or an ultrasonic sensor and/or a multi-camera sensor is/are employed as an environment sensor in the sensor module according to the invention. The first and second environment sensors can basically be the same sensor type or different sensor types. For example, lidar sensors operate in a wavelength range of 905 nm or approximately 1550 nm. The sensor module preferably comprises a see-through area through which the environment sensor looks in order to detect a vehicle environment. The material of the see-through area is preferably transparent to the wavelength range used by the environment sensor and selected as a function of the wavelength range(s) used by the environment sensor. Other sensor types, which are not mentioned here, can also be employed in principle.

Particularly preferably, the invention also relates to a panel component of a motor vehicle, the panel component having at least one opening in which at least one sensor module according to the invention is disposed in a movable manner. According to this embodiment, the sensor housing can comprise a cover or a lid part, which is preferably configured to close the at least one opening in a flush and preferably moisture-proof manner when the sensor housing is in the retracted position. The cover is preferably configured in the shape of the opening, production- and function-related tolerances considered, so that it can close the opening. The base area of the cover can preferably have a shape which is adapted to the geometry of the panel component so that an optically smooth appearance is established. The cover can preferably comprise a weather strip which is disposed circumferentially in an outer edge area of the cover and provides sealing relative to the panel component. Alternatively or additionally, a weather strip can also be disposed on the panel component, for example, in an edge area of the opening. When in the cover position, the cover is preferably in flush contact with the weather strip so that a moisture-proof sealing relative to the opening is possible. The sensor housing is preferably also shaped in such a manner that it also enables a moisture-proof sealing relative to the opening of the panel component in each deployed position of the sensor housing.

In another preferred embodiment, the panel component is a fender, a bumper or an outer cladding component of a sunroof, a window, a door, a sliding roof, a top, a folding top, a hood, a front hood or a trunk lid. Other panel components of a motor vehicle, which are not mentioned here, can also be comprised by the invention in principle. Of course, a motor vehicle can also comprise more than one of the panel components mentioned above, which can preferably each comprise a sensor module according to the invention. For instance, the sensor module according to the invention (according to the first and the second aspect) can preferably be disposed at the front and/or at the rear and/or in a lateral area of a vehicle roof or a roof module. Also, the sensor module according to the invention (according to the first and the second aspect) can preferably be integrated in other places of the motor vehicle, such as a fender, an A- and/or a B- and/or a C-pillar of the vehicle body, a rear lid, a bumper and/or any other front or rear module and be used to detect the vehicle environment.

Particularly preferably, the present invention also relates to a roof module for forming a vehicle roof on a motor vehicle, the roof module comprising a panel component which at least partially forms a roof skin of the vehicle roof The roof skin serves as an outer sealing surface of the roof module. The panel component forming the roof skin comprises at least one sensor module according to the invention according to any one of the exemplary embodiments of the present invention.

Also, the invention relates to a motor vehicle comprising at least one panel component according to the invention. Particularly preferably, the invention relates to a motor vehicle comprising a roof frame structure and an aforementioned roof module, which can be installed on the roof frame structure as a structural unit.

The roof module can form a structural unit in which features for autonomous or semi-autonomous driving assisted by driver assistance systems are integrated and which can be placed on a vehicle body shell as a structural unit by a vehicle manufacturer. Furthermore, the roof module according to the invention can be a purely fixed roof or a roof including a roof opening system. Moreover, the roof module can be configured for use in a passenger car or a utility vehicle. The roof module can preferably be provided as a structural unit in the form of a roof sensor module (RSM), in which the environment sensors are provided, so as to be inserted into a roof frame of a vehicle body as a suppliable structural unit.

Of course, the embodiments and the illustrative examples mentioned above and yet to be discussed below can be realized not only individually but also in any combination with each other without departing from the scope of the present invention. Moreover, any and all embodiments and illustrative examples of the sensor module also relate to a panel component, in particular a roof module, comprising such a sensor module and to a motor vehicle having such a panel component, in particular such a roof module.

An embodiment of the invention is schematically illustrated in the drawing and will be discussed as an example below.

BRIEF DESCRIPTIONS OF THE DRAWINGS

FIG. 3 is a perspective view of a panel component comprising an exemplary embodiment of a sensor module according to the invention in three positions;

FIG. 8 is a side view of a panel component comprising an exemplary embodiment of a sensor module according to the invention in three positions.

DETAILED DESCRIPTION

Figure 1:
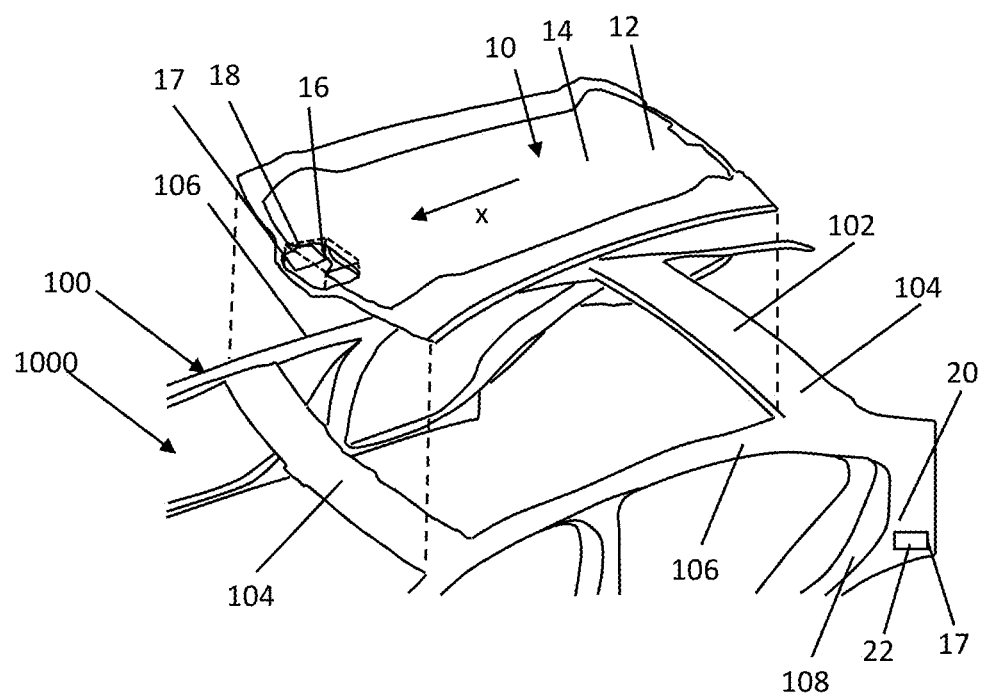
FIG. 1 is a perspective view of a motor vehicle comprising multiple panel components and two sensor modules according to the invention.

FIG. 1 shows a motor vehicle 1000 having a vehicle roof 100. Vehicle roof 100 is formed by a roof module 10 in the case at hand. Roof module 10 can be placed on a roof frame structure 102 of the motor vehicle body as a structural unit, which is indicated by dashed lines. Roof module 10 comprises a first panel component 12 for forming a roof skin 14 of vehicle roof 100. In a front middle roof portion of roof module 10 with respect to a vehicle length direction x, a first sensor module 16 is disposed in an opening of the first panel component 12 in a retractable and deployable manner. First sensor module 16 is disposed directly behind a front transverse rail 104, which defines a header of the roof of the vehicle. The front transverse rail, the rear transverse rail 104 and two side rails 106 together form roof frame structure 102.

First sensor module 16 comprises a first environment sensor 17, which is a multi-camera, for example, and a second environment sensor 18, which can be a lidar sensor, for example. Other sensors types, such as (multidirectional) cameras and/or ultrasonic sensors, can be employed. Furthermore, sensor module 16 comprises a sensor housing 19, in which both first environment sensor 17 and second environment sensor 18 are at least partially disposed. In the case at hand, environment sensors 17 and 18 are each fully disposed in the housing. However, sensor housing 19 can also be a partial housing or a housing portion. First and second environment sensors 17 and 18 are each configured to send and/or receive electromagnetic signals to thus detect a vehicle environment of motor vehicle 1000 (e.g., for autonomous driving or parking).

In the case at hand, the motor vehicle body comprises other components besides roof frame structure 102, which are each covered by panel components, which form an outer skin of the motor vehicle. For example, the motor vehicle body comprises a fender 108, a fender of a rear wheel (not shown) being illustrated in the case at hand. Fender 108 is covered by an appropriately shaped second panel component 20, which defines an outer skin of fender 108. A second sensor module 22 is disposed in an opening of second panel component 20 in a retractable and deployable manner. First sensor module 16 and second sensor module 22 can be identical or technically different sensor modules (comprising other environment sensors 18, for example). Explanations made in relation to first sensor module 16 can equivalently relate to second sensor module 22. Explanations made in relation to second sensor module 22 can in turn equivalently relate to first sensor module 16. In the case at hand, first sensor module 16 differs from second sensor module 22 in that first sensor module 16 comprises first and second environment sensors 17 and 18, whereas second sensor module 22 comprises only one environment sensor. The environment sensor of second sensor module 22 is identical to second environment sensor 18 and therefore provided with the same reference sign. For simplification, first and second sensor modules 16 and 22 will also simply be referred to as sensor module 16, 22.

Figure 2:
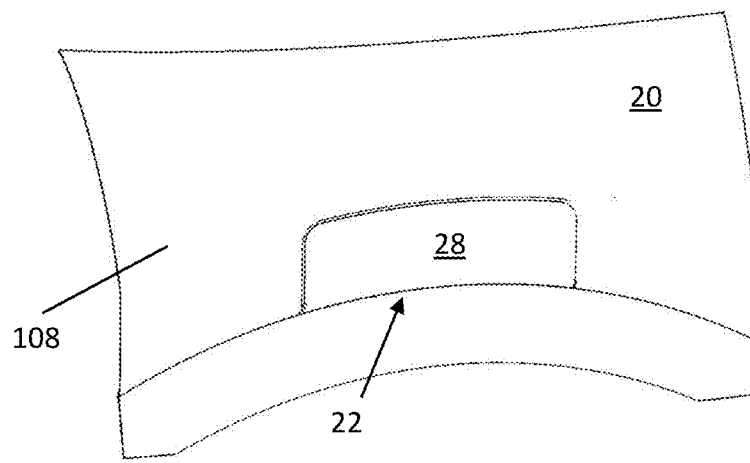
FIG. 2 is a detail view of a panel component comprising an exemplary embodiment of a sensor module according to the invention.
Figure 4:
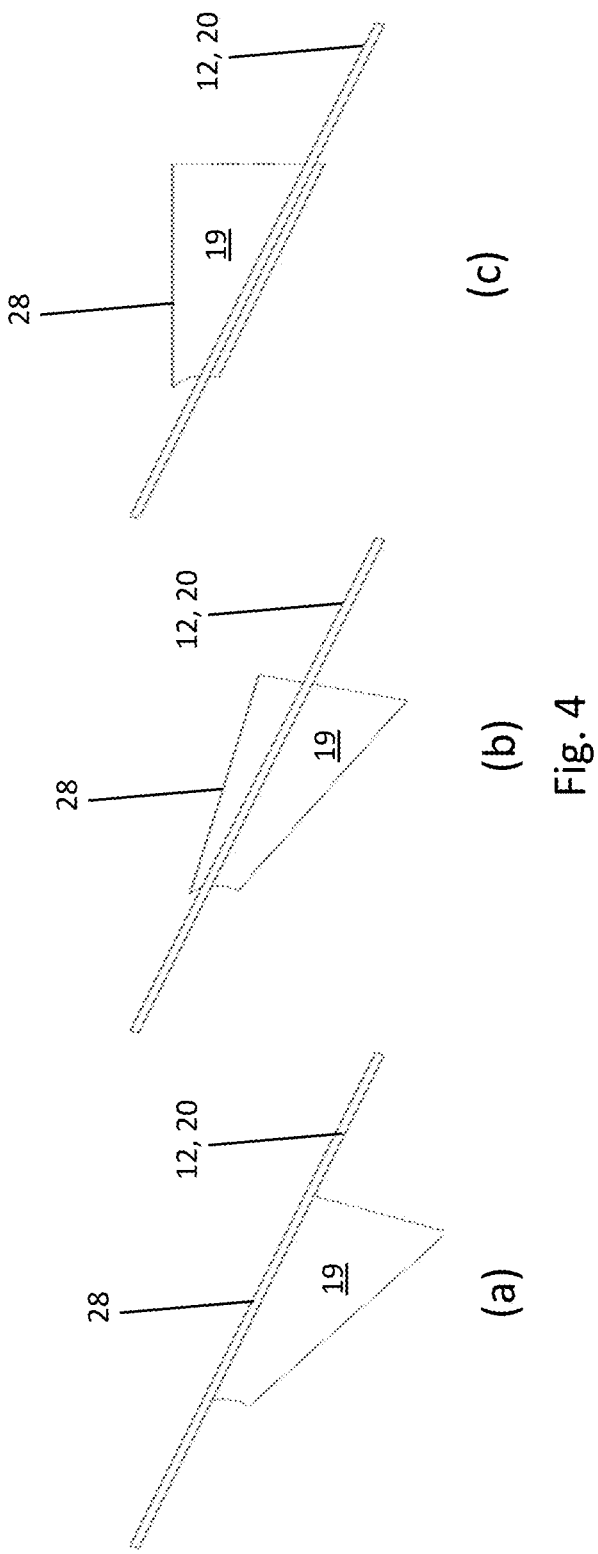
FIG. 4 is a side view of a panel component comprising an exemplary embodiment of a sensor module according to the invention in three positions.

FIG. 2 shows a detail view of a portion of a fender 108 which comprises an opening in which sensor module 16, 22 is disposed in a retractable and deployable manner. Sensor module 16, 22 further comprises a kinematic system 24, which has a drive 26, which is configured to move sensor housing 19 from a retracted position (see FIGS. 3(a), 4(a), 6(a), 7(a) and 8(a)) into at least one deployed position. Drive 26 is schematically indicated in FIG. 8 and can be an electric motor or an electric stepper motor. Other drives or types of drives (mechanical and/or pneumatic drives) are possible, as well.

Furthermore, sensor housing 19 comprises a cover 28, which forms a lid part of sensor housing 19, the lid part closing a respective opening in a respective panel component 12, 20 flushly with a respective panel component when sensor housing 19 is in the retracted position (see FIGS. 3(a), 4(a), 6(a), 7(a) and 8(a)). A cross section of cover 28 preferably corresponds to a cross section of the covered (flushly closed) opening of the respective panel component, tolerances considered. Furthermore, sensor housing 19 is supported on roof frame structure 102, for example, or another body structure in a rotatable manner via at least one guide lever 30 (see FIG. 8).

Sensor housing 19 comprises at least one see-through area 32, through which the at least one environment sensor 17, 18 can look in order to detect the vehicle environment. Respective see-through area 32 of the respective environment sensor 17, 18 is preferably transparent to wavelength ranges in which the respective environment sensor 17, 18 operates.

In the case of FIG. 3, sensor housing 19 comprises three see-through areas 32, 32' and 32" on a front housing portion 34. Two of the three see-through areas 32', 32" are positioned on sensor housing 19 or front housing portion 34 in such a manner relative to third see-through area 32 that they are closer to cover 28. First environment sensor 17 looks through the two see-through areas 32' and 32" in order to detect the vehicle environment. Second environment sensor 18 looks through third see-through area 32 in order to detect the vehicle environment.

According to a first exemplary embodiment, sensor module 16, 22 can comprise the at least one environment sensor 18, such as a lidar sensor, as described above. According to the first exemplary embodiment, sensor module 16, 22 may comprise only one see-through area 32, which is installed in front housing portion 34 in the manner of a window (see FIGS. 6 and 8). According to the first exemplary embodiment, sensor module 16, 22 is characterized in that the kinematic system 24 is configured to move sensor housing 19 into a first deployed position (see FIGS. 4(b), 5(a), 6(b), 7(b), 8(b)), which activates the at least one environment sensor 18 to detect the vehicle environment in a portion 35 of its field of view 36 (see FIG. 7(b)). Furthermore, kinematic system 24 is configured to move sensor housing 19 into a second deployed position, which activates the at least one environment sensor 18 to detect the vehicle environment in its entire field of view 36 (see FIG. 7(c)). Portion 35 of field of view 36 has a smaller cone opening angle than entire field of view 36. Thus, the environment sensor can detect only part of the vehicle environment. Other areas of the vehicle environment cannot be detected by the environment sensor. So in this exemplary embodiment (see FIGS. 6 and 7), environment sensor 18 can selectively detect the vehicle environment when in the first deployed position. In the first deployed position, sensor housing 19 is deployed in such a manner relative to panel component 12, 20 that only part of see-through area 32 protrudes over panel component 12, 20 (see FIG. 6(b)). In the second deployed position, sensor housing 19 is deployed in such a manner relative to panel component 12, 20 that entire see-through area 32 protrudes over panel component 12, 20 (see FIG. 6(c)).

Figure 5:
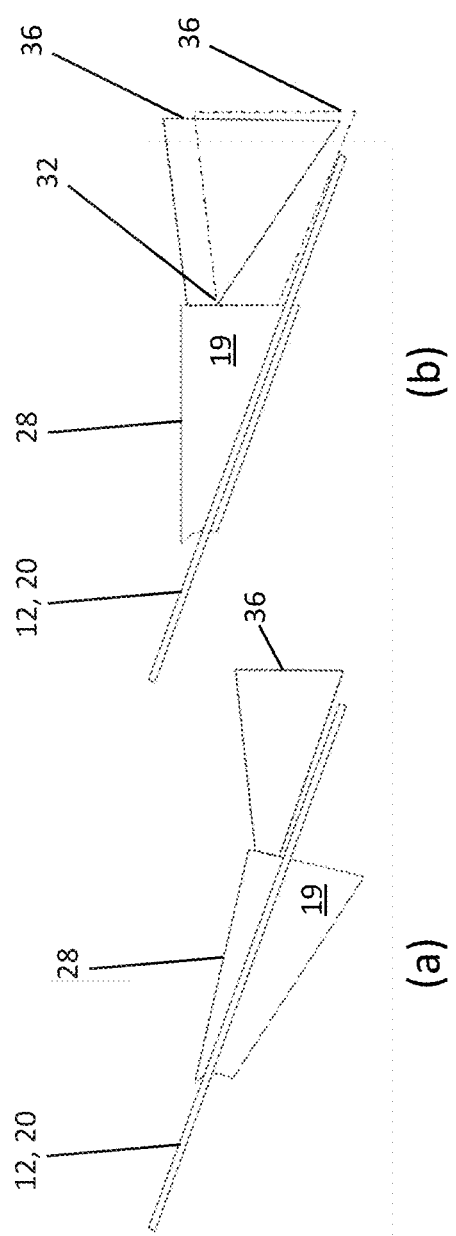
FIG. 5 is a side view of a panel component comprising an exemplary embodiment of a sensor module according to the invention in two positions.
Figure 6:
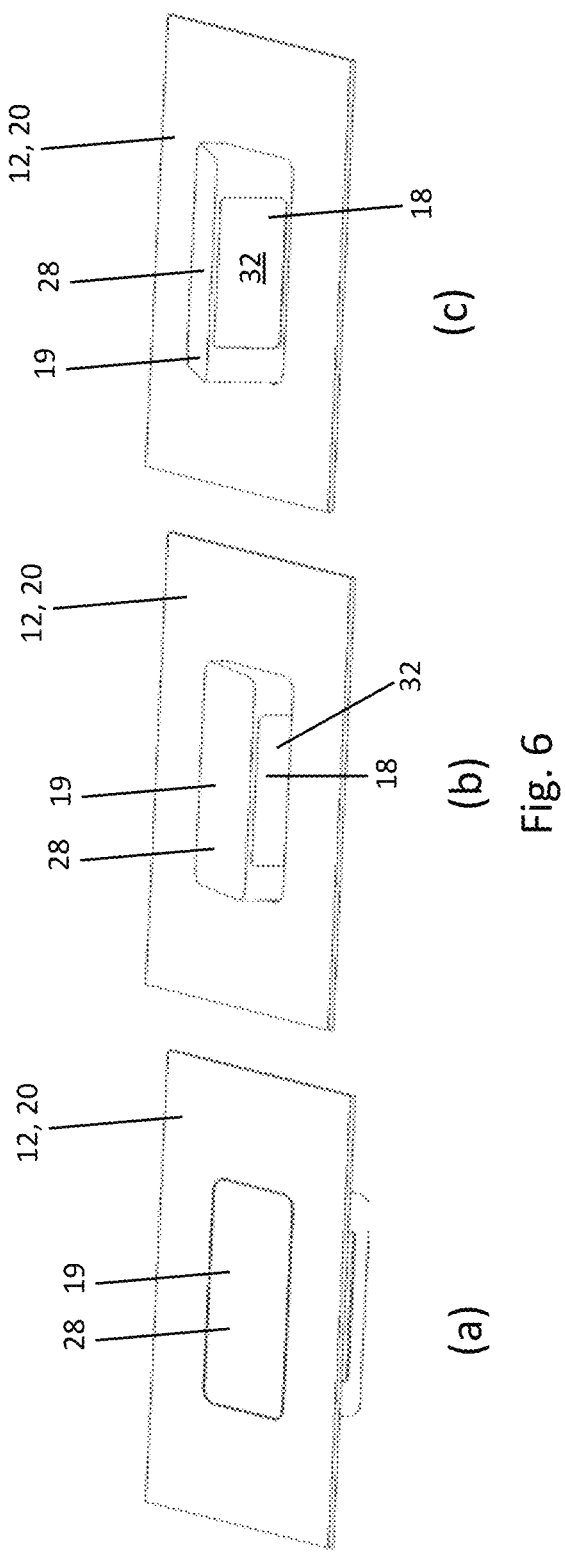
FIG. 6 is a perspective view of a panel component comprising an exemplary embodiment of a sensor module according to the invention in three positions.
Figure 7:
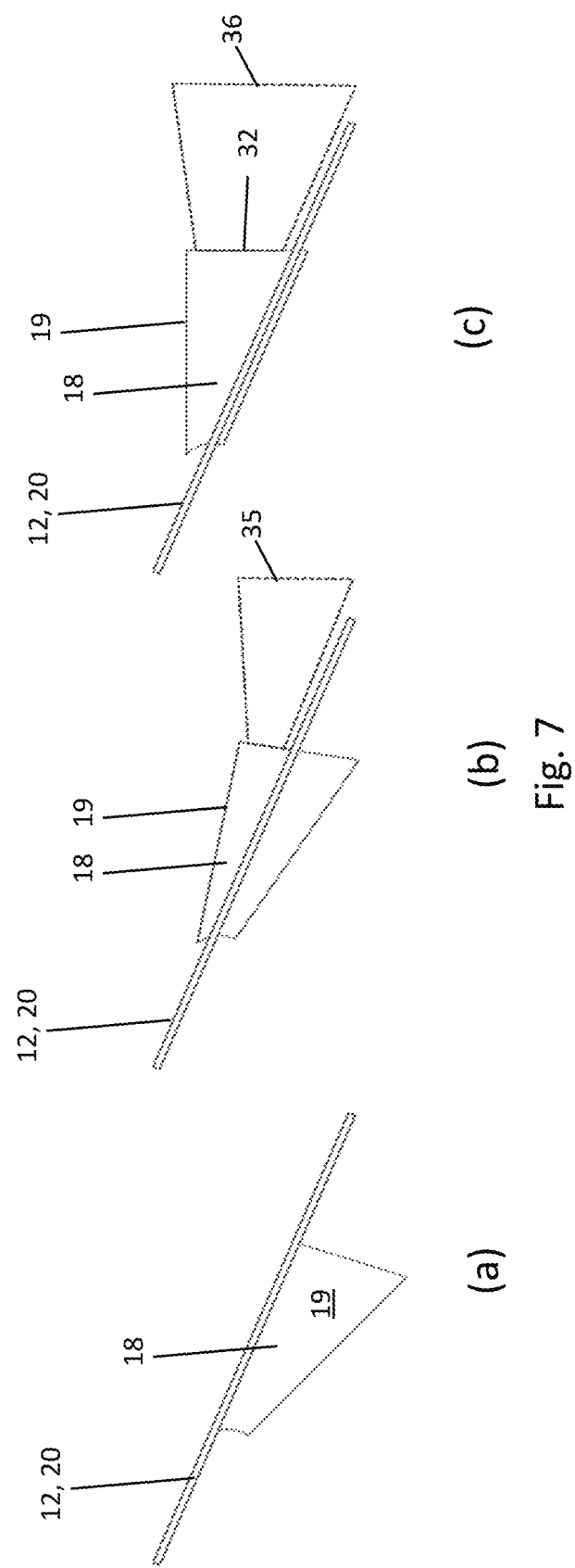
FIG. 7 is a side view of a panel component comprising an exemplary embodiment of a sensor module according to the invention in three positions.

According to a second exemplary embodiment, sensor module 16, 22 can comprise first and second environment sensors 17 and 18 as described above. First environment sensor 17 can comprise two ultrasonic sensors, for example. Second environment sensor 18 can comprise a lidar sensor, for example. According to the first exemplary embodiment, sensor module 16, 22 can comprise the three see-through areas 32, 32', 32", which are each installed in front housing portion 34 in the manner of windows at a distance from each other (see FIG. 3). According to the second exemplary embodiment, sensor module 16, 22 is characterized in that kinematic system 24 is configured to move sensor housing 19 into a first deployed position (see FIGS. 3(b) and 5(a)), which activates first environment sensor 17 to detect the vehicle environment and in which second environment sensor 18 is preferably deactivated, and to move sensor housing 19 into a second deployed position (see FIGS. 3(c) and 5(b)), which activates second environment sensor 18 to also detect the vehicle environment. As can be seen in FIG. 5(b), field of view 36 of first environment sensor 17 overlaps with field of view 36 of second environment sensor 18 in the second deployed position. The second deployed position preferably corresponds to a fully deployed position (see FIG. 5(b)). In the case at hand, environment sensor 17 has a field of view 36 with a smaller cone opening angle compared to second environment sensor 18 (see FIG. 5(b)). So in the first deployed position, only first environment sensor 17 is activated. In the second deployed position, on the other hand, second environment sensor 18 is activated, as well. Thus, a selective activation of environment sensors 17 and 18 is possible.

For moving sensor housing 19, kinematic system 24 has a controller 38, which is configured to detect a current position of sensor housing 19, for example. Controller 38 can preferably be configured to activate first and/or second environment sensor 17, 18 as a function of the respective position (see schematically in FIG. 8(b)).

With reference to FIG. 8, kinematic system 24 comprises a slide 40 according to any exemplary embodiment according to the invention. Drive 26 can preferably comprise a drive pinion (not shown). The drive pinion or drive 26 can be connected to slide 40 in a force-transmitting manner via a spindle nut drive 42. Alternatively, a flexible shaft (not shown) can be disposed on the drive pinion. Drive 26 is configured to move slide 40 back and forth along an essentially linear track by means of spindle nut drive 42.

A slot 44 is provided in slide 40, a sliding pin 46 being supported in slot 44 in a translationally movable manner. Sliding pin 46 can be disposed on sensor housing 19 in a rigid (translationally immobile) manner. Slide 40 can be disposed on a spindle nut 48 of spindle nut drive 42 in a rigid (translationally immobile) manner. Spindle nut drive 42 further comprises a spindle 50, which can rotate relative to spindle nut 48, allowing drive 26 to move spindle nut 48 and slide 40 with it back and forth on spindle 50.

Slot 44 comprises a ramp-shaped section (see FIG. 8), drive 26 being configured to move slide 40 in such a manner that sliding pin 46 slides along the ramp-shaped section. Slide 40 is configured in such a manner that sliding pin 46 can preferably slide between a first stop position, which fixes sensor housing 19, i.e., environment sensor 17, 18, in the retracted position (see FIG. 8(a)), and a second stop position (see FIG. 8(c)), which fixes sensor housing 19, i.e., environment sensor 17, 18, in the second deployed position. When sensor housing 19, i.e., environment sensor 17, 18, is in the first deployed position, on the other hand, sliding pin 46 is disposed in a middle area of ramp-shaped slot 44 (see FIG. 8(b)). The movement of spindle nut 48 along spindle 50, which is driven by drive 26, causes the slide to translationally move along a drive axis 52. Since sliding pin 46 is fixed to sensor housing 19 and sensor housing 19 is connected to, for example, roof frame structure 102 or another body structure via guide lever 30 in a rotatable but stationary manner, a relative movement of slide 40 along drive axis 52 causes sliding pin 46 to move along slot 44. This causes sensor housing 19 to rotate about its axis of rotation 54, which is determined by a bearing point of guide lever 30 an roof frame structure 102 or another body structure. Consequently, sensor housing 19 (see FIG. 8(a)) moves.

The invention claimed is:

1. A sensor module for being mounted on a panel component of a motor vehicle, the sensor module comprising:
   a sensor housing,
   a first and a second environment sensor, at least part of each of which is disposed in the sensor housing and which are each configured to send and/or receive electro-magnetic signals to thus detect a vehicle environment, and
   a kinematic system having a drive is configured to move the sensor housing from a retracted position into a first deployed position, which activates the first environment sensor, which is an image capturing sensor, by opening the housing enough to the outside to provide a field of view and at the same time deactivate the second environment sensor, which is a second image capturing sensor, according to a signal based on housing position in such specific way that the second sensor remains fully shaded and deactivated at a specific stop point.

2. The sensor module according to claim 1, wherein the kinematic system comprises a controller which is configured to detect and/or adjust a current position of the sensor housing and to activate the first and/or the second environment sensor as a function of the current position.

3. The sensor module according to claim 1, wherein the kinematic system comprises a slide, and the drive is connected to the slide in a force-transmitting manner via a flexible shaft or a spindle nut drive.

4. The sensor module according to claim 3, wherein the drive is configured to move the slide back and forth along a guided, preferably linear, curved, circular and/or similarly shaped track by means of the flexible shaft or the spindle nut drive.

5. The sensor module according to claim 3, wherein a slot is provided in the slide, a sliding pin being supported in the slot in a translationally movable manner, the sliding pin being rigidly connected to the sensor housing and/or a spindle nut of the spindle nut drive.

6. The sensor module according to claim 3, wherein the slot comprises a ramp-shaped section, the drive being configured to move the slide in such a manner that the sliding pin slides along the ramp-shaped section, the sliding pin being able to move between a first stop of the slot, which fixes the sensor housing in the retracted position, and a second stop of the slot, which fixes the sensor housing in a fully deployed position.

7. The sensor module according to claim 1, wherein the at least one environment sensor comprises a lidar sensor and/or a camera sensor and/or a multi-camera sensor.

8. A panel component of a motor vehicle, the panel component having at least one opening in which at least one sensor module according to claim 1 is disposed in a movable manner, the sensor housing comprising a cover configured in such a manner that it closes the at least one opening in a flush and preferably moisture-proof manner when the sensor housing is in the retracted position.

9. A panel component according to claim 8, wherein the panel component is a fender, a bumper or an external cladding component of a sunroof, a window, a door, a sliding roof, a top, a folding top, a hood, a front hood or a trunk lid.

10. A roof module for forming a vehicle roof on a motor vehicle, the roof module comprising a panel component according to claim 8, which at least partially forms a roof skin of the vehicle roof and serves as an outer visible surface of the roof module.

11. A motor vehicle comprising at least one panel component according to claim 8.

12. A motor vehicle comprising a roof frame structure and a roof module according to claim 10, which is installed on the roof frame structure as a structural unit.

* * * * *